United States Patent [19]
Kakuda

[11] Patent Number: 6,068,284
[45] Date of Patent: May 30, 2000

[54] STROLLER WITH ONE HAND RELEASE MECHANISM AND ONE HAND RELEASE MECHANISM THEREOF

[75] Inventor: Baku Kakuda, Reading, Pa.

[73] Assignee: Graco Children's Products Inc., Elverson, Pa.

[21] Appl. No.: 08/912,131

[22] Filed: Jul. 29, 1997

[51] Int. Cl.$^7$ ........................................................ B62B 7/08
[52] U.S. Cl. ........................ 280/642; 280/647; 280/655
[58] Field of Search ................................... 280/642, 643, 280/647, 648, 650, 654, 655, 657, 658; 74/502

[56] References Cited

U.S. PATENT DOCUMENTS

| | | |
|---|---|---|
| 215,283 | 3/1879 | Jury . |
| 632,018 | 8/1899 | Merkoolyeff . |
| 867,894 | 10/1907 | Moore . |
| 924,008 | 6/1909 | Smith . |
| 1,053,325 | 2/1913 | Smith . |
| 1,125,934 | 1/1915 | Beasecker et al. . |
| 1,753,931 | 4/1930 | Lewis . |
| 2,341,117 | 2/1944 | Reinholz . |
| 2,378,931 | 6/1945 | Kiesow . |
| 2,480,570 | 8/1949 | Goldberg . |
| 2,534,539 | 12/1950 | Topper . |
| 2,616,719 | 11/1952 | Heideman . |
| 2,781,225 | 2/1957 | Heideman . |
| 2,989,318 | 6/1961 | Schenkman . |
| 3,061,328 | 10/1962 | Konar . |
| 3,248,125 | 4/1966 | Gill . |
| 3,459,435 | 8/1969 | Garner . |
| 3,556,546 | 1/1971 | Garner . |
| 3,692,323 | 9/1972 | Sekine . |
| 3,736,021 | 5/1973 | MacLaren . |
| 3,873,117 | 3/1975 | Perego . |
| 3,901,528 | 8/1975 | Miyagi . |
| 4,191,397 | 3/1980 | Kassai . |
| 4,248,443 | 2/1981 | Ohlson . |
| 4,317,581 | 3/1982 | Kassai . |
| 4,335,900 | 6/1982 | Fleischer . |
| 4,362,315 | 12/1982 | Kassai . |
| 4,564,212 | 1/1986 | Orlandino et al. . |

(List continued on next page.)

FOREIGN PATENT DOCUMENTS

| | | |
|---|---|---|
| 0481452 | 4/1992 | European Pat. Off. . |
| 815 454 | 8/1951 | Germany . |

OTHER PUBLICATIONS

BE 9800573 Belgian Search Report bearing the date of Oct. 12, 1999.

*Primary Examiner*—Lanna Mai
*Assistant Examiner*—Ruth Ilan
*Attorney, Agent, or Firm*—Foley & Lardner

[57] ABSTRACT

A stroller has a frame that is foldable or collapsible between an extended configuration and a collapsed configuration. A pair of locking devices are mounted on the frame to lock the frame in the extended configuration. The frame also has a handle or handle bar connected to portions of the frame connected to the locking devices. The stroller has a release mechanism mounted on a portion of the handle. The release mechanism has a moving member rotatably mounted to the handle portion. The moving member carries a rotation-to-linear motion transfer mechanism, which includes grooves. A pair of pins are movably mounted to the handle portion and engage the grooves. The pins are connected to the locking devices using wires. The grooves guides and moves the pins toward each other to release both locking devices when the moving member is rotated. A rotation lock prevents the moving member from releasing the locking devices. The rotation lock has a receiving member mounted on the handle portion and a reciprocating member mounted on the moving member. The reciprocating member engages the receiving member to prevent the moving member from rotating. The moving member and the reciprocating member are operable with a single hand to release the locking devices.

10 Claims, 14 Drawing Sheets

U.S. PATENT DOCUMENTS

| | | |
|---|---|---|
| 4,577,877 | 3/1986 | Kasai . |
| 4,586,399 | 5/1986 | Kassai . |
| 4,606,550 | 8/1986 | Cone . |
| 4,610,460 | 9/1986 | Kassai . |
| 4,632,420 | 12/1986 | Miyagi . |
| 4,632,421 | 12/1986 | Shamie . |
| 4,643,445 | 2/1987 | Cabagnero . |
| 4,660,850 | 4/1987 | Nakao et al. . |
| 4,741,551 | 5/1988 | Perego . |
| 4,763,911 | 8/1988 | Gebhard et al. . |
| 4,770,429 | 9/1988 | Freyman . |
| 4,770,437 | 9/1988 | Gläser . |
| 4,779,879 | 10/1988 | Kassai . |
| 4,817,982 | 4/1989 | Kassai . |
| 4,832,361 | 5/1989 | Nakao et al. . |
| 4,836,573 | 6/1989 | Gebhard . |
| 4,846,494 | 7/1989 | Kassai . |
| 4,848,787 | 7/1989 | Kassai . |
| 4,906,017 | 3/1990 | Kassai . |
| 5,039,118 | 8/1991 | Huang . |
| 5,056,805 | 10/1991 | Wang . |
| 5,074,575 | 12/1991 | Bigo . |
| 5,087,066 | 2/1992 | Mong-Hsing . |
| 5,121,951 | 6/1992 | Harbom ......................... 292/DIG. 38 |
| 5,158,319 | 10/1992 | Norcia et al. . |
| 5,168,601 | 12/1992 | Liu . |
| 5,181,735 | 1/1993 | Onishi . |
| 5,184,835 | 2/1993 | Huang . |
| 5,205,578 | 4/1993 | Liu . |
| 5,205,579 | 4/1993 | Kato et al. . |
| 5,215,320 | 6/1993 | Chen . |
| 5,257,799 | 11/1993 | Cone et al. . |
| 5,362,089 | 11/1994 | Jyan-Tsai . |
| 5,388,852 | 2/1995 | Bigo et al. . |
| 5,417,450 | 5/1995 | Wang . |
| 5,421,603 | 6/1995 | Wills et al. . |
| 5,427,402 | 6/1995 | Huang . |
| 5,454,584 | 10/1995 | Haut et al. . |
| 5,460,398 | 10/1995 | Huang . |
| 5,472,224 | 12/1995 | Cabagnero . |
| 5,478,102 | 12/1995 | Haung . |
| 5,490,685 | 2/1996 | Kitayama et al. . |
| 5,605,409 | 2/1997 | Haut et al. . |

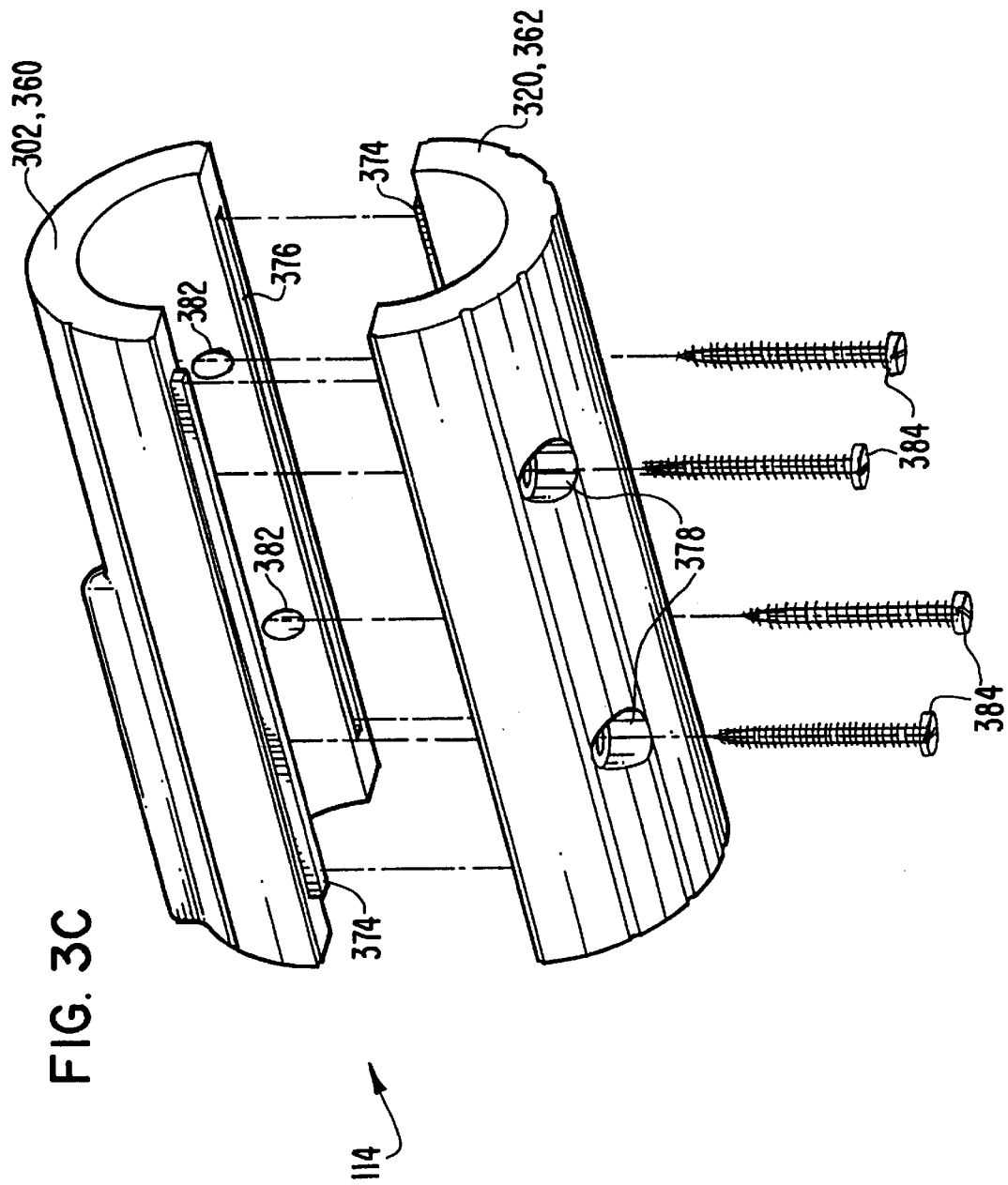

6,068,284

STROLLER WITH ONE HAND RELEASE MECHANISM AND ONE HAND RELEASE MECHANISM THEREOF

BACKGROUND OF THE INVENTION

1. Field of the Invention

The following invention is directed to a stroller, and more particularly to a stroller that can collapse to a non-use position.

2. Description of the Related Art

Collapsible strollers are well-known in the art. However, the mechanism that allows the stroller to collapse is generally cumbersome and requires the use of both hands.

Strollers that can be folded by using one hand are also generally known. Cone, U.S. Pat. No. 4,606,550, discloses a squeeze trigger type mechanism used to unlock the stroller and allow the stroller to collapse. Cone uses a release bar that extends across the length of the handlebar and is drawn toward the handlebar to unlock the stroller.

Nakao et al., U.S. Pat. No. 4,832,361, uses a pair of levers located in the central part of the handlebar. These two levers are connected to cables threaded through the interior of the handlebars and attached to locks. The levers can be used to unlock the stroller and allow the stroller to collapse. It should be noted that Nakao et al. requires the use of both hands.

Kassai, U.S. Pat. No. 4,846,494, uses an operating button that is connected to a pair of cables via a complicated mechanical linkage.

Cone et. al., U.S. Pat. No. 5,257,799, is similar to Cone ('550) discussed above. The Cone ('799) also uses a release bar that is pulled toward the handlebar to unlock the stroller and allow the stroller to collapse.

Kato et. al., U.S. Pat. No. 5,205,579, discusses an operating mechanism for releasing the locking mechanisms of a collapsible stroller. The operating mechanisms of Kato is rotatable and the rotating motion is converted by a complicated mechanical linkage to linear motion.

The prior art suffers from a number of problems. The operating mechanisms with release bars are disadvantageous because items can get caught between the release bar and the handlebar and could possibly pinch the operator or the passengers' fingers. Further, the mechanisms with release bars generally add weight to the stroller and are cumbersome and difficult to actuate. They also suffer from having exposed mechanical parts subject to wear and increased friction. The other mechanisms that use either levers, buttons, or a rotary member, all have a high degree of mechanical complexity and a large number of small parts. These factors tend to reduce reliability and increase the frequency of breakdown. There is currently a need for a stroller that can be folded with one hand, is mechanically reliable, and prevents inadvertent unlocking of the stroller.

SUMMARY OF THE INVENTION

Accordingly, the present invention is directed to a stroller that substantially obviates one or more of the disadvantages of the related art strollers.

An object of the present invention is to provide a stroller that allows an operator to easily collapse the stroller.

Another object of the present invention is to provide a stroller that allows an operator to collapse the stroller using only one hand.

Yet another object of the present invention is to provide a stroller with a mechanism that allows easy collapse of the stroller.

It is a further object to provide a stroller to provide a mechanism to prevent the stroller from being inadvertently collapsed.

Additional features and advantages of the invention will be set forth in the description that follows, and in part will be apparent from the description, or may be learned by practice of the invention. The objectives and other advantages of the invention will be realized and attained by the structure particularly pointed out in the written description and claims as well as the appended drawings.

To achieve these and other advantages and in accordance with the purposes of the present invention, as embodied and broadly described, the present invention includes a stroller with wheels and a passenger support portion comprising: a frame having a first extended configuration and a second collapsed configuration; and at least one latch member for allowing the stroller to collapse into the second collapsed configuration, a portion of the frame defining a handle portion including a moving member, the moving member connected to the at least one latch member to produce a force having sufficient energy to slidably release the at least one latch member.

The stroller can also include a moving member rotates about an axis generally parallel to the longitudinal axis of the handle.

The stroller can also include a moving member connected to a plate via a wire, the plate located proximate the latch and being rigidly related to a slidable catch, wherein the plate is located inside a tube and the slidable catch is located outside the tube, and wherein the plate and the slidable catch are connected by a mechanical fastener that extends through an elongate hole disposed on the tube.

In another aspect, the present invention is directed to a stroller with wheels and a passenger support portion comprising: a frame having a first extended configuration and a second collapsed configuration, and at least one latch member for allowing the stroller to collapse into the second collapsed configuration, a portion of the frame defining a handle portion including a generally cylindrical portion, the cylindrical portion defining a longitudinal axis and having a moving member generally rotatable about the longitudinal axis, the moving member comprising at least one groove, at least one pin associated with the groove, and operatively connected to the at least one latch member.

The stroller can also include a moving member comprised of generally two half shells wherein each of the two half shells comprises at least one aligning mortise, and wherein each of the two half shells comprises at least one aligning tenon, and wherein each of the two half shells define an aperture adapted to receive a mechanical fastener, and wherein at least one of the half shells comprises a recess and a shoulder adapted to cooperate with a mechanical fastener.

In yet another aspect, the present invention is directed to a stroller with wheels and a passenger support portion comprising: a frame having a first extended configuration and a second collapsed configuration, and at least one latch member for allowing the stroller to collapse into the second collapsed configuration, a portion of the frame defining a handle portion including a generally cylindrical portion, the cylindrical portion defining a longitudinal axis and having a moving member being generally rotatable about the longitudinal axis, the moving member further including a resiliently biased locking member to prevent inadvertent rotation of the moving member.

The stroller can also include a locking member, which includes a nose portion disposed on the moving member, the nose portion cooperating with a receiving member disposed on a stationary member, wherein the resilient bias is provided by a spring member integrally formed with a nose portion and wherein the locking member has a first locked position and a second unlocked position, a nose portion cooperating with a lip disposed on a stationary member when the locking member is in the second unlocked position, and wherein when the locking member is in the second unlocked position, the lip keeps the nose portion biased inward, and when the locking member is returned to the first locked position, the nose portion automatically engages a receiving member, and wherein when the locking member is integrally formed on the moving member.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings:

FIG. 3C is an exploded assembly view of the moving member in accordance with the present invention;

DETAILED DESCRIPTION OF THE PREFERRED EMBODIMENTS

The present invention relates to a stroller, and more particularly to a collapsible stroller with an improved mechanism for folding the stroller. Reference will now be made in detail to the preferred embodiments of the present invention, examples of which are illustrated in the accompanying drawings.

Figure 1:
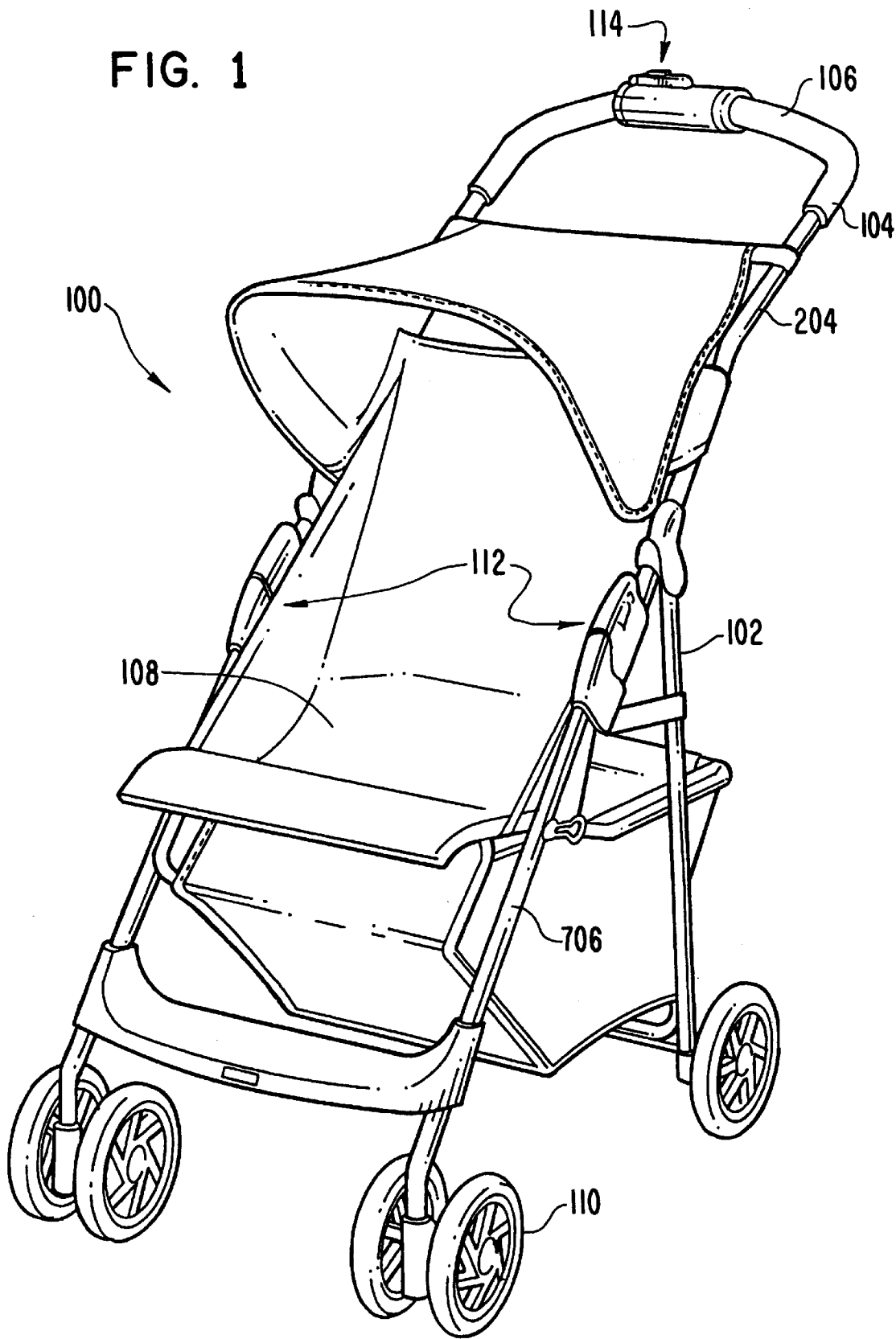
FIG. 1 is a perspective view of a stroller in accordance with the present invention.

FIG. 1 shows a preferred embodiment of a stroller 100 in accordance with the present invention. The stroller generally comprises a frame 102 having a handle portion 104. The handle portion also includes a gripping portion 106. The stroller includes a passenger support 108 that is used to hold a child and a suitable number of wheels 110 to allow easy transport. The preferred stroller 100 also includes at least one locking device 112 (e.g., a latch). This locking device allows the stroller to collapse from an extended position as shown in FIG. 1 to a collapsed position. The specific structural details of the stroller and the associated elements which allow the stroller to collapse are discussed in the assignee's prior patent, U.S. Pat. No. 5,454,584, which is incorporated by reference. The present improved stroller includes moving member 114 that actuates at least one of the locking devices 112 and thereby allows for the one-handed operation and folding of the preferred stroller.

Figure 2:
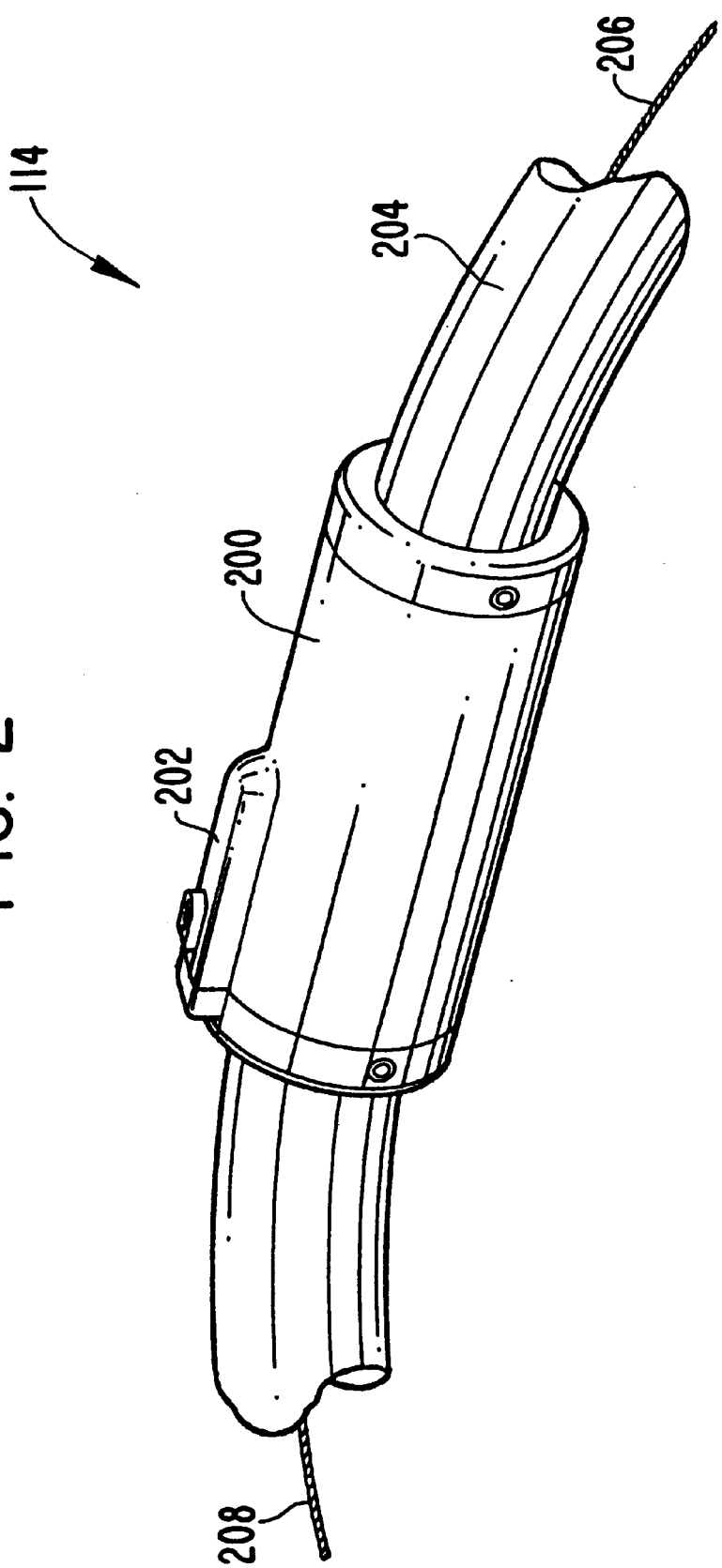
FIG. 2 is an enlarged view of a moving member in accordance with the present invention.

FIG. 2 shows an enlarged view of the moving member 114. The preferred moving member comprises a moving portion 200 and a lock portion 202. The preferred moving member 114 is mounted on a tube 204. Preferably, the moving member is mounted at a central location along handle 104 (see FIG. 1). Wires 206 and 208 extend through the tube and to the moving portion 200.

Figure 3A:
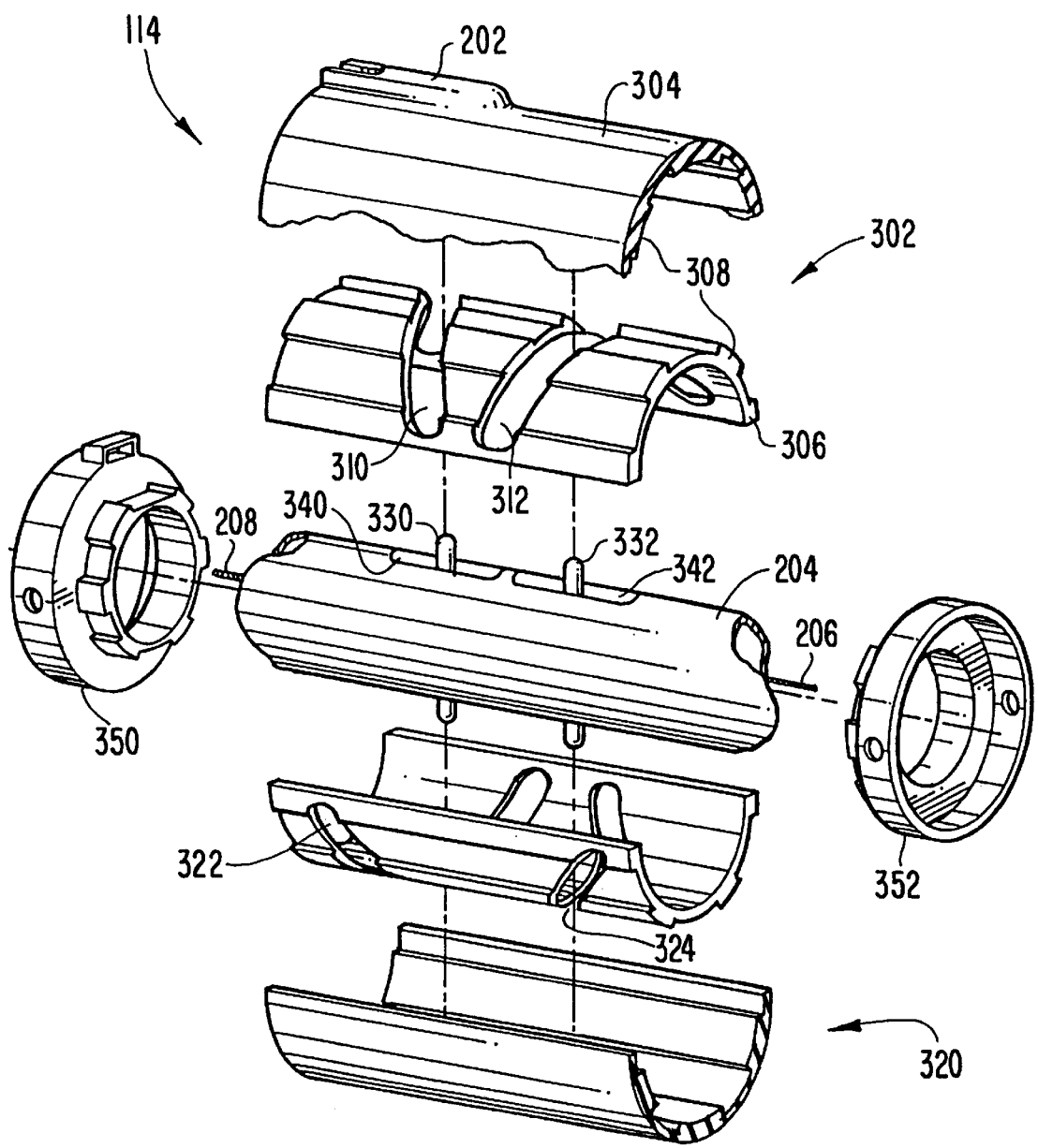
FIG. 3A is an exploded view of one embodiment of the moving member in accordance with the present invention.
Figure 3B:
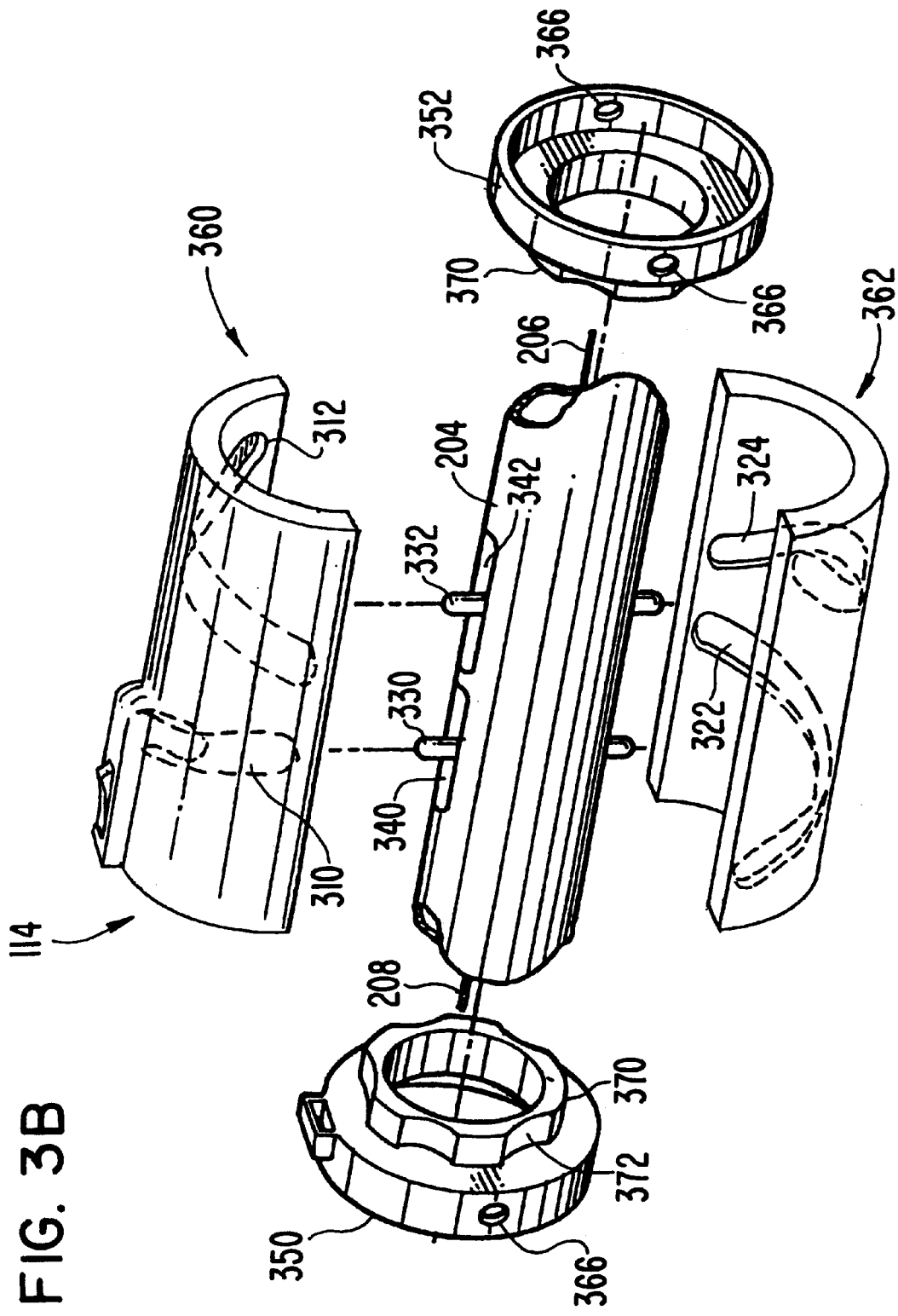
FIG. 3B is an exploded view of another embodiment of the moving member in accordance with the present invention.

FIGS. 3A and 3B show an exploded view of two embodiments of moving member 114. The first embodiment, shown in FIG. 3A, has two half shells, a first half shell 302 and a second half shell generally designated 320. The half shells are structurally similar and are mirror image halves of each other except for the grooves, which will be discussed later. Given that the two half shells are structurally similar only the first half shell will be discussed in detail.

The first half shell 302 includes an outer member 304 and an inner member 306. The outer member 304 provides a grasping surface for an operator. The inner and outer members are joined by any convenient method. However, the instant invention prefers the use of splines 308. The splines 308 can be straight splines or they can be dove-tailed. Straight splines are preferred. The spines help to rigidly relate the inner and outer members 304, 306, respectively, and the splines 308 also prevent the outer member 304 and the inner member 306 from slipping circumferentially with respect to each other.

The inner member includes grooves 310 and 312. These grooves 310 and 312 cooperate with respective pins 330 and 332. The pins are joined to wires 208 and 206. The lower portions of pins 330 and 332 are received in cooperating slots 322 and 324 disposed on the second half shell member. The grooves 310 and 322 cooperate with pin 330, and grooves 312 and 324 cooperate with pin 332.

Considering the first set of grooves 310 and 322, the grooves 310 and 322 are constructed in a way that allows the two grooves to move pin 330 axially along the length of the tube when the grooves are rotated. Pin 330 protrudes out of slot 340 cut into the tube. There is another slot similar to 340 disposed on the bottom side of the tube, which slot is not shown in the tubes. As the moving member 114 is rotated by an operator, the rotation of the moving member causes the grooves 310 and 322 to slide pin 330 axially along the length of the shaft. In other words, the goal of the moving member 114 is to convert rotational motion into linear axial motion. When the pin 330 moves along the axial length of tube 204, pin 330 pulls wire 208 along with it. The motion and force of the wire is then used to release the latch.

In a similar manner, grooves 312 and 324 cooperate with pin 332 to slide pin 332 along slot 342 when the moving member is rotated.

The second embodiment; shown in FIG. 3B, uses a one-piece construction. The first half shell 360 and the second half shell 362 are formed of a single monolithic piece of material. In all other respects, besides the configuration of the half shells, the preferred second embodiment is structurally identical to the first embodiment.

Another feature of the present invention are the end caps 350 and 352, shown in FIGS. 3A and 3B. The end caps 350 and 352 are riveted to tube 204. The end caps provide a suitable number of apertures 366 (see FIG. 3B) for the rivets (not shown).

Each of the end caps 350 and 352 have extensions 370. The extensions are adjacent to the inner surface of the half shelves 360 and 362 and half shelves 302 and 320 shown in FIG. 3A. The extensions include pockets or scallops 372, which are used to hold dirt and other debris. These scallops by holding dirt and debris reduce damage to the other members of the moving member.

Figure 3D:
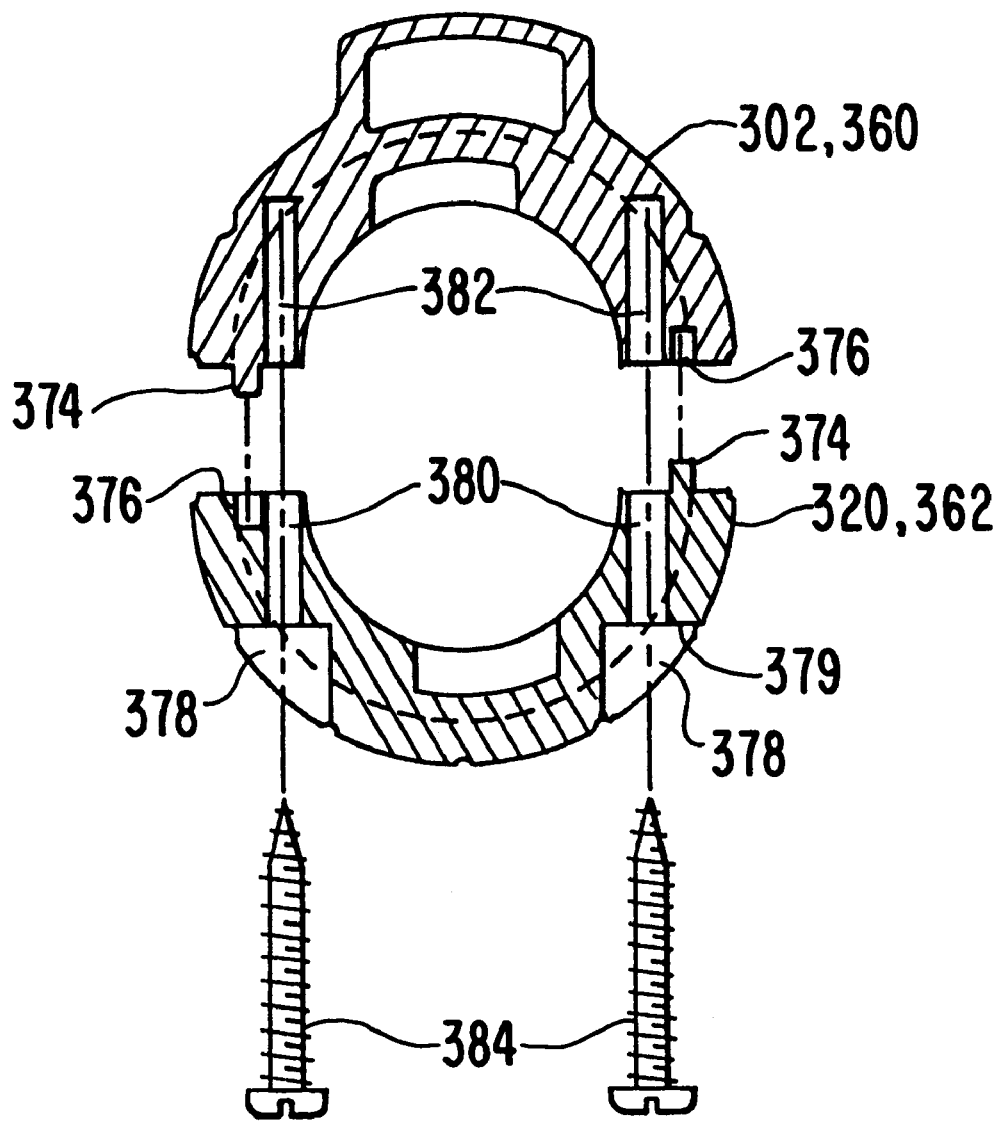
FIG. 3D is a cross-sectional assembly view of the moving member in accordance with the present invention.

FIGS. 3C and 3D show how the two half shells 302, 320 or 360 and 362, are assembled. FIG. 3C shows a perspective view from underneath the handle of the moving member 114 and FIG. 3D shows a cross-section. As shown in FIGS. 3C and 3D, the moving member 114 generally includes two half shells which are cut axially. The half shells are generally semi-cylindrical members. The joint between the two half shells 302, 360 and 320, 362, includes an aligning mortise 374 that fits into an aligning tenon 376. As shown in FIG. 3D there is one mortise and tenon set on each side of the half shell joints. In the preferred embodiment, the first half shell, 302, 360 has a tenon on one side and a mortise on the other side, while the second half shell 320, 362 has a mortise on one side an a tenon on the other. As shown in FIG. 3D, they are constructed with the tenons aligning with the respective mortises The half shells can be attached with just this mortise and tenon joint and an adhesive.

To further support the joint, the use of a mechanical fastener, for example a screw, is preferred. The second half shell 320, 362 has a number of recesses 378. These recesses prevent the screws 384 from protruding out of the outer surface of the moving member 114. The recesses also include a shoulder 379, which allow the heads of the screws to bear against the second half shell and form a solid joint. The second half shell 320, 362 includes a suitable number of apertures 380. Aligned with these apertures 380 are a series of blind holes 382. Preferably, the apertures in the blind holes are not threaded and self-taping screws 384 are used. Any number of mechanical fasteners can be used. However, the exemplary embodiment shown in FIGS. 3C and 3D use four threaded fasteners. The assembly could use just the mortise and tenon joint, or just the threaded fasteners or screws 384, or the assembly could use a combination of both aligning mortises and tenon joint and a mechanical fastener. The exemplary embodiment, shown in FIGS. 3C and 3D, uses the combination of the threaded fastener and the mortise and tenon joint.

Figure 4:
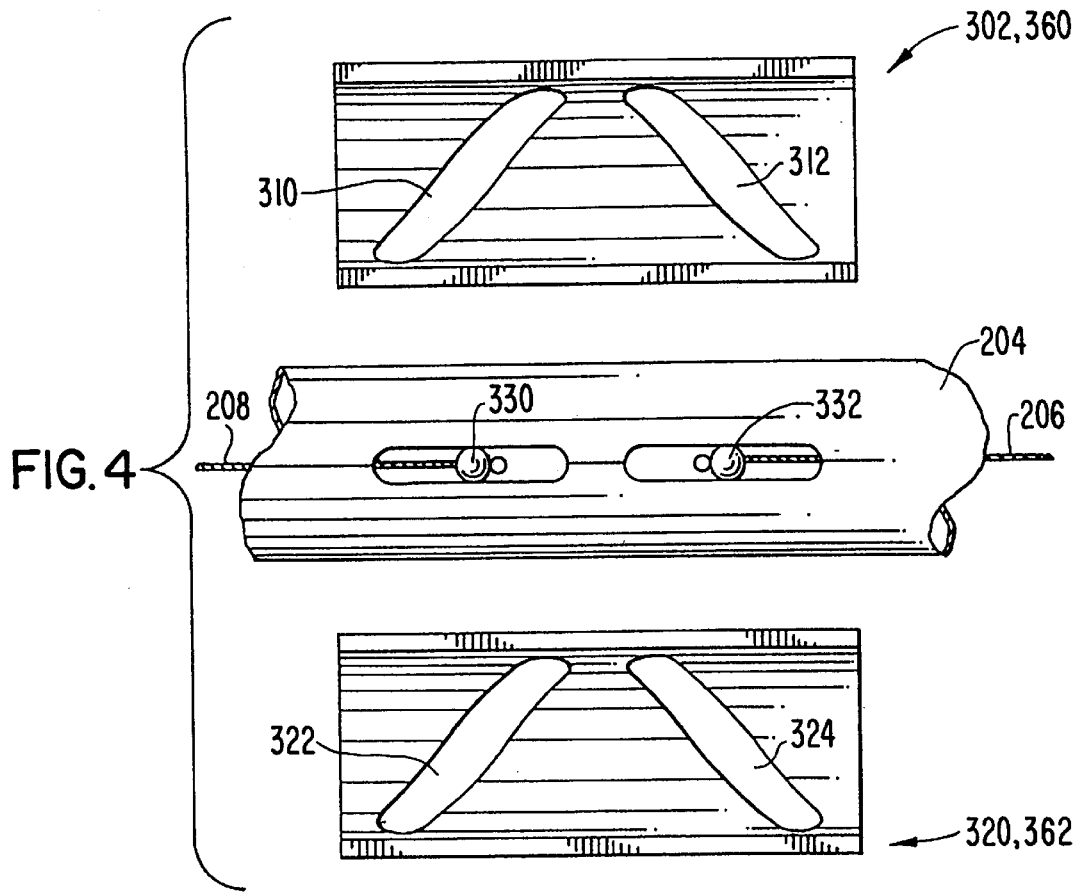
FIG. 4 is a pre-assembly view of the moving member in accordance with the present invention.

FIG. 4 shows moving member 114 prior to assembly. The specific cam profiles of the grooves 310, 312, 322, and 324 can be seen in this figure. While any cam profile can be used for the shape of the grooves, the preferred embodiment has a cam profile that generally runs linearly along the circumference of the inner member. In other words, if the inner member were to be laid flat, the shape of the grooves would be straight diagonal lines.

Figure 5:
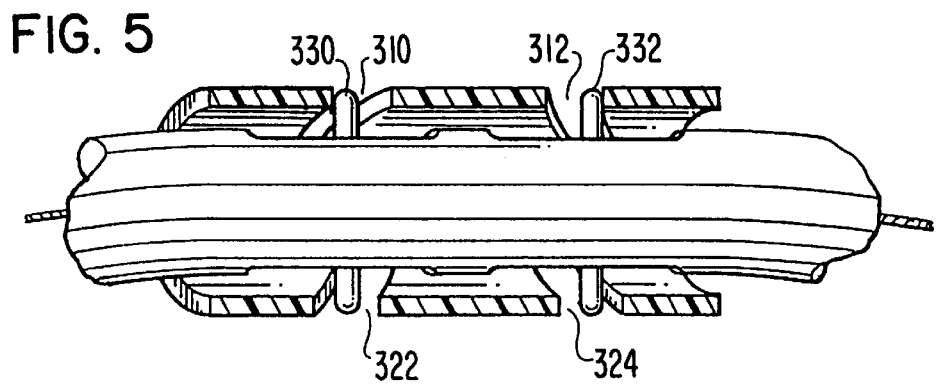
FIG. 5 is a schematic view of a partially assembled moving member in accordance with the present invention.

FIG. 5 shows a partially assembled view of the device and clearly shows the protrusions of pins 330 and 332 out of slots 340 and 342. FIG. 5 also shows the engagement of the grooves 310, 312, 322, and 324 with pins 330 and 332.

Figure 6:
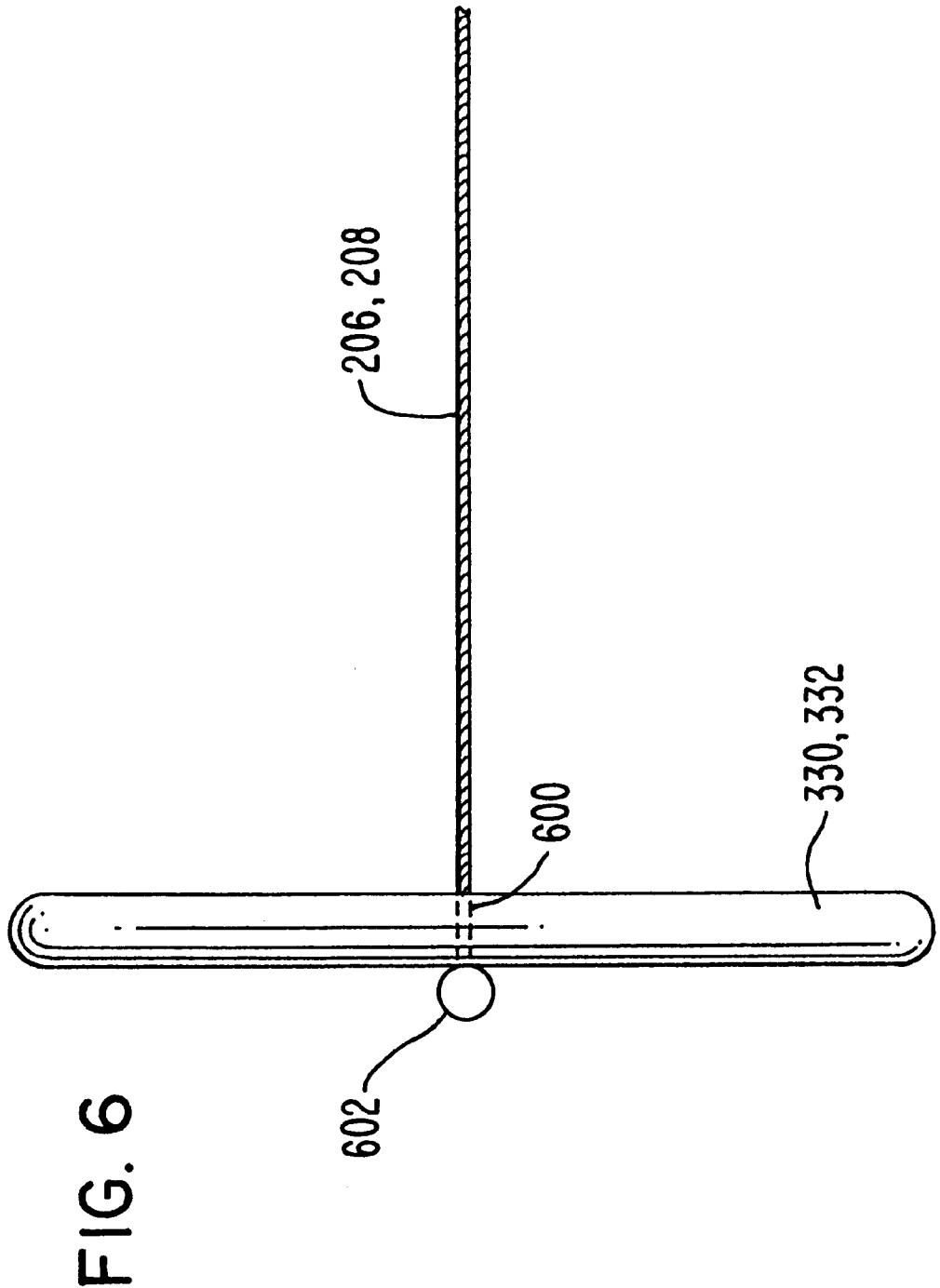
FIG. 6 is an enlarged view of the joint between a wire and a pin in accordance with the present invention.

FIG. 6 shows the details of the connection between wires 208 and 206 and pins 330 and 332. It is preferred that the connection between the two wires and the two pins are identical. Wire 208 and 206 are threaded through a suitable hole 600 bored through pins 330 and 332. The wire is then attached to a sphere 602. The sphere 602 functions like a cotter pin insure that the pins 330 and 332 do not extend beyond the end of the wire 206 and 208. The system is generally in a state of tension and the pins 330 and 332 are generally used to drag the wire 206 and 208 using sphere 602.

Figure 7:
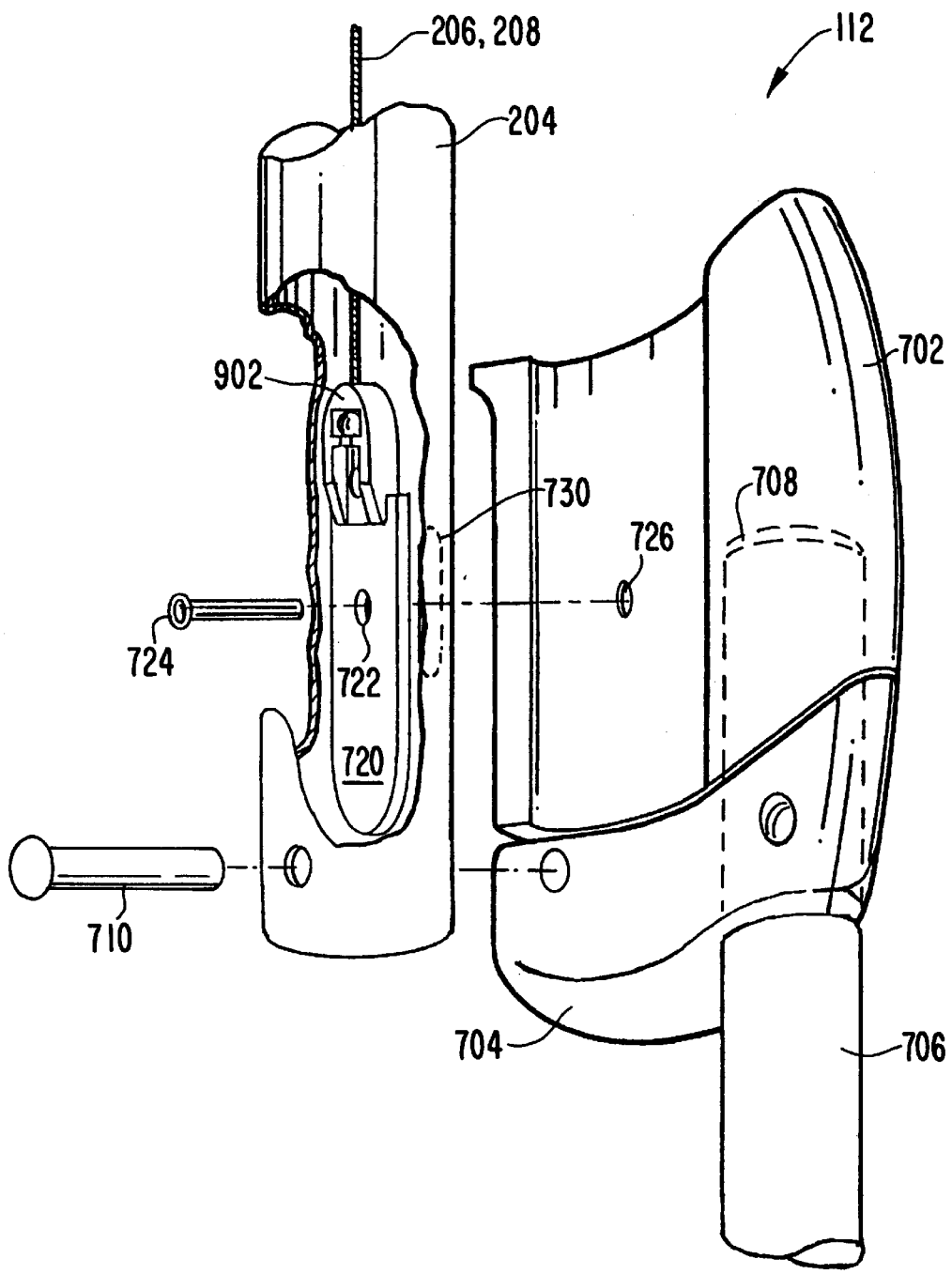
FIG. 7 is an exploded cut-away view of a plate and a locking device in accordance with the present invention.
Figure 8:
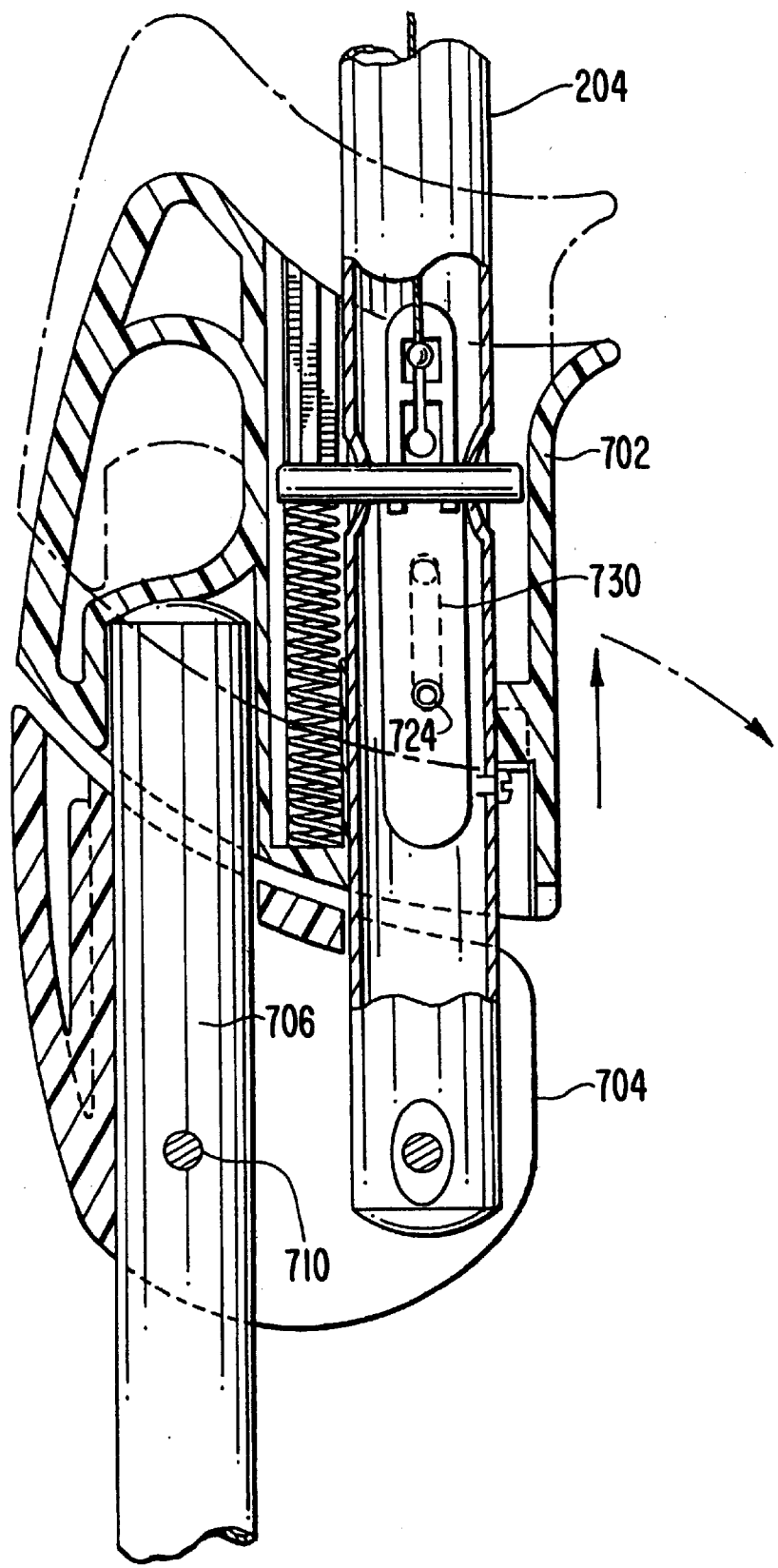
FIG. 8 is a cross-sectional view of a locking device in accordance with the present invention.

FIGS. 7 and 8 show the details of the other end of the wires 206 and 208. FIG. 7 is an exploded, cut-away view of locking device 112. This view shows the assembly, which is near the locking device 112 and more particularly, this view shows slidable catch 702 and body 704. Also shown in the Figure, wire 206 or 208 is attached to a plate 720.

The preferred locking device 112 is similar to the one disclosed in U.S. Pat. No. 5,454,584 which was previously incorporated by reference. The preferred locking device comprises a slidable catch 702 that works in cooperation with a body 704. A forward tube 706 or first leg is rigidly attached to the body 704. The forward tube 706 protrudes beyond the body and extends into the slidable catch 702. The slidable catch has an aperture 708 to receive the protruding end of forward tube 706. When the slidable catch 702 is moved upwards as shown in FIG. 7, the slidable catch clears the protruding end of forward tube 706. When the slidable catch clears the protruding end of the forward tube 706, tube 204 can pivot with respect to tube 706 about hinge 710. This facilitates collapsing of the stroller.

As discussed above, one end of the wire is attached to one of the pins 330 or 332. The opposite end of the wire 206 or 208 is attached to a plate 720. This plate 720, as well as the wire 206 and 208 are all disposed within tube 204.

The upper portion of plate 720 includes a wire retention portion 902 that will be discussed in greater detail below. The plate 720 also includes an aperture 722. The aperture 722 is designed to receive a rivet 724, which extends through an elongate slot 730 cut into tube 204. The rivet 724 then connects to the slidable catch 702 via an aperture 726 formed on the slidable catch 702.

This assembly rigidly relates the plate 720, disposed on the interior of tube 204, with the slidable catch 702 disposed exterior to tube 204. The elongate slot 730 allows plate 720 and slidable catch 702 to slide vertically (as shown in FIGS. 7 and 8) with respect to tube 204. FIG. 8 shows the sliding action. The released position is shown in phantom in FIG. 8.

Figure 9A:
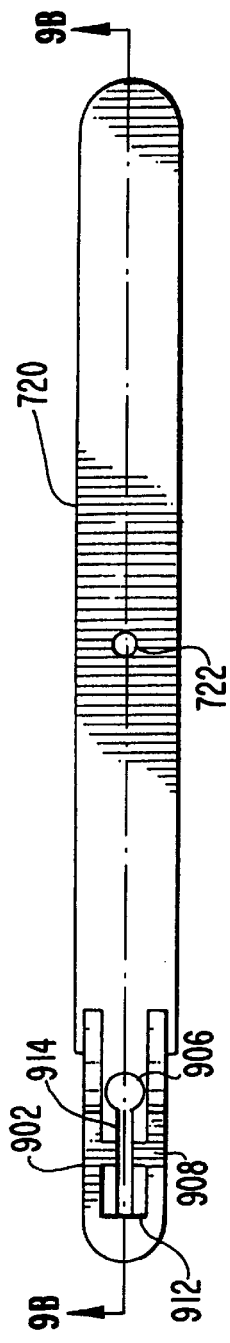
FIG. 9A is a top view of a plate in accordance with the present invention.
Figure 9B:
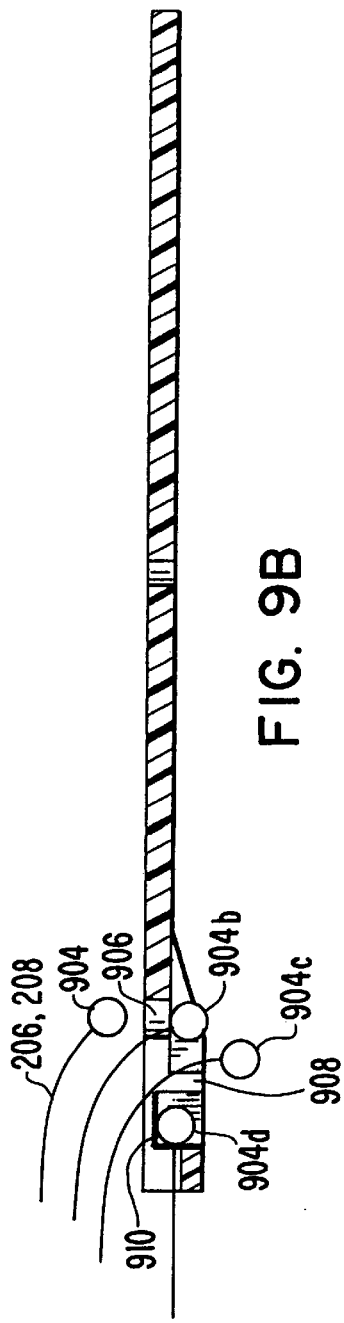
FIG. 9B is a cross-sectional side view of a plate in accordance with the present invention.
Figure 9C:
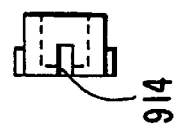
FIG. 9C is an end view of a plate in accordance with the present invention.

FIGS. 9A–9C show three views of plate 720. The plate 720 has a wire receiving portion 902. The wire receiving portion 902 is designed to hold the end of a wire which terminates in a sphere 904. The wire receiving portion 902 has an aperture 906 that sphere 904 enters. After the sphere 904 passes through the aperture 906, the sphere 904 assumes a position 904b. Then the sphere 904 is drawn over ridge 908. This position is shown as 904c. Finally, the sphere 904 enters pocket 910. This position of the sphere is shown as 904d. The sphere is bounded by a front wall 912 and ridge 908. During this entire process, the wire 206, 208 extends through slot 914. See FIGS. 3C and 3A.

Figure 10:
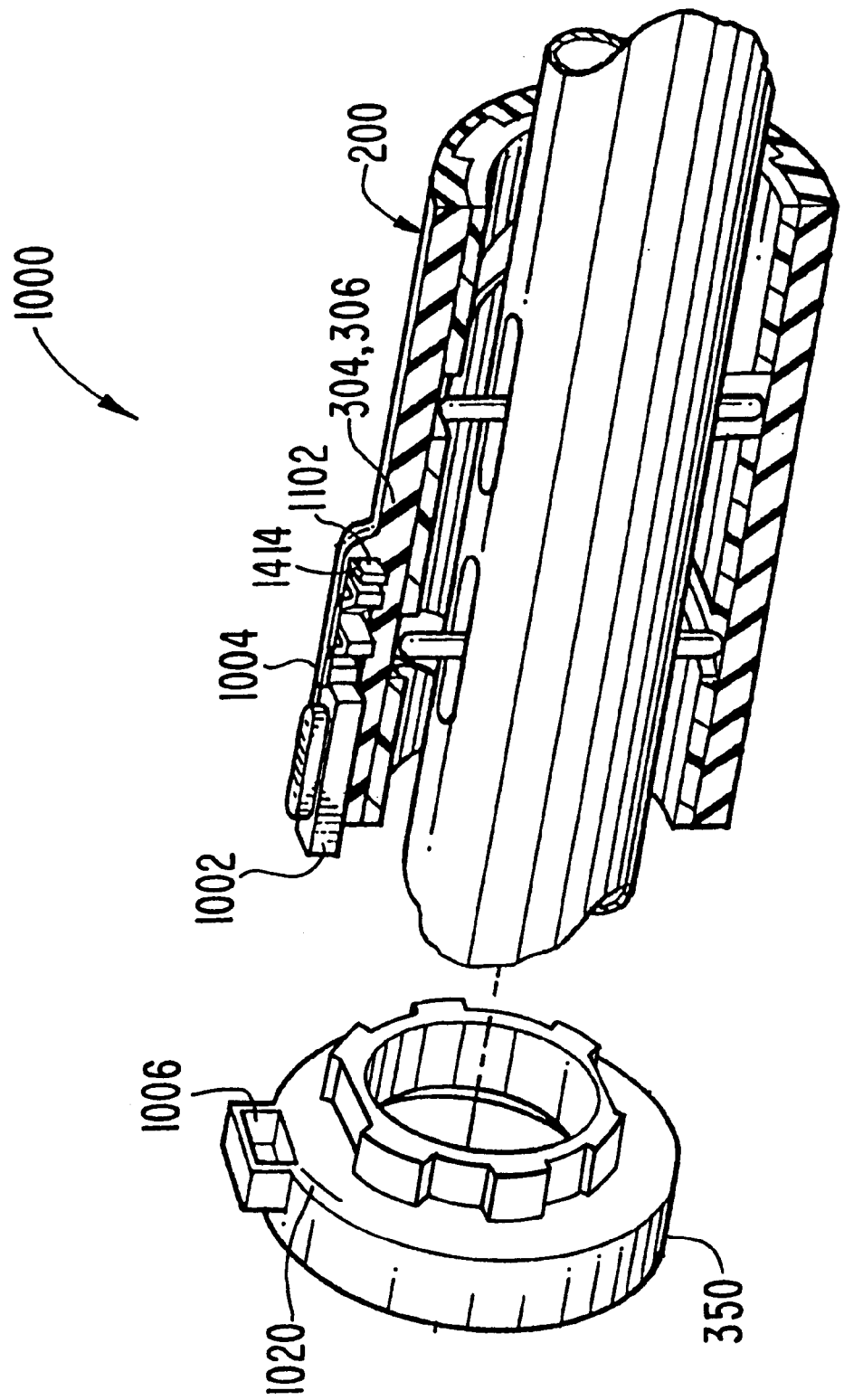
FIG. 10 is an exploded cross-sectional view of the moving portion and a rotation lock in accordance with the present invention.
Figure 11:
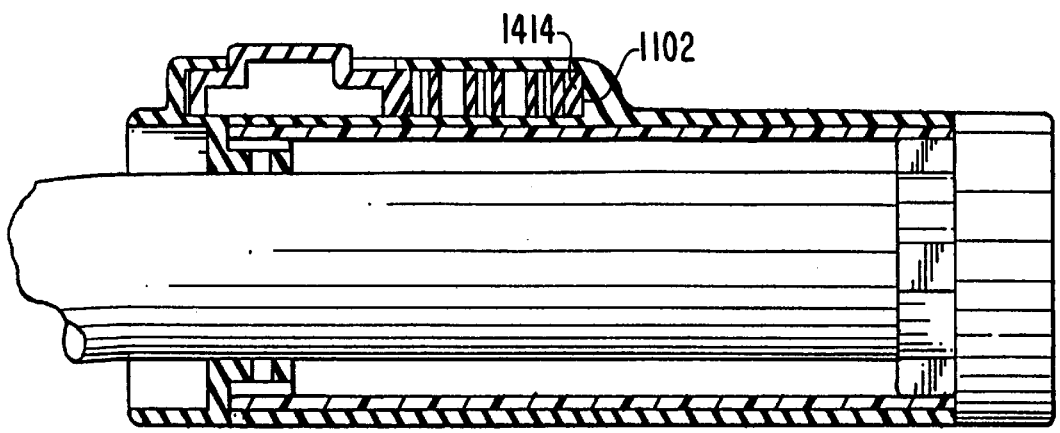
FIG. 11 is a schematic cross-sectional view of the moving member in a first locked position in accordance with the present invention.
Figure 12:
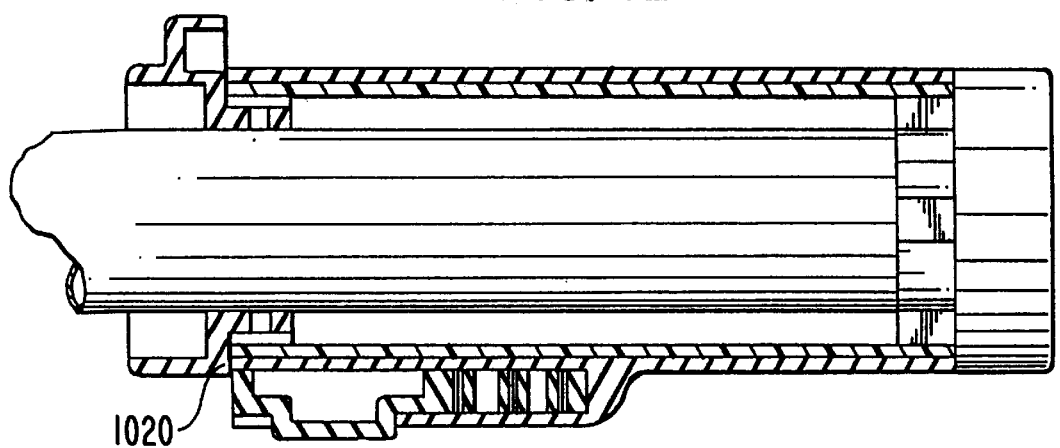
FIG. 12 is a schematic cross-sectional view of the moving member in a second released position in accordance with the present invention.
Figure 13:
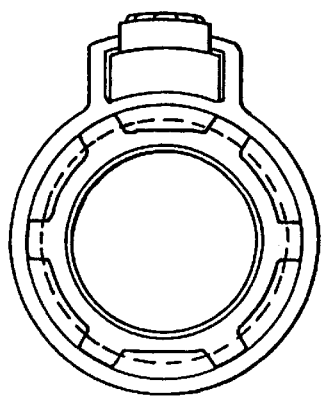
FIG. 13 is a front view of the moving member in accordance with the present invention.
Figure 14A:
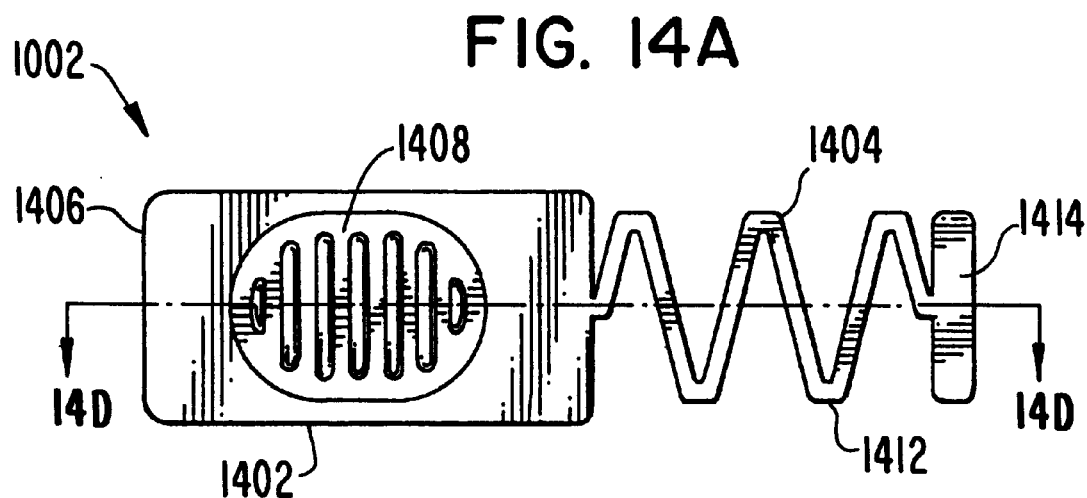
FIG. 14A is a top view of the projecting member in accordance with the present invention.
Figure 14B:
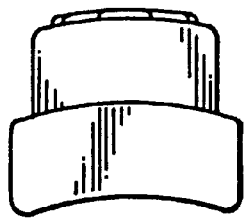
FIG. 14B is a front view of the projecting member in accordance with the present invention.
Figure 14C:
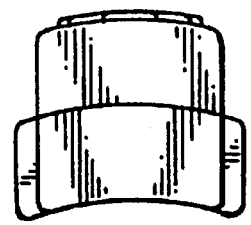
FIG. 14C is a rear view of the projecting member in accordance with the present invention.
Figure 14D:
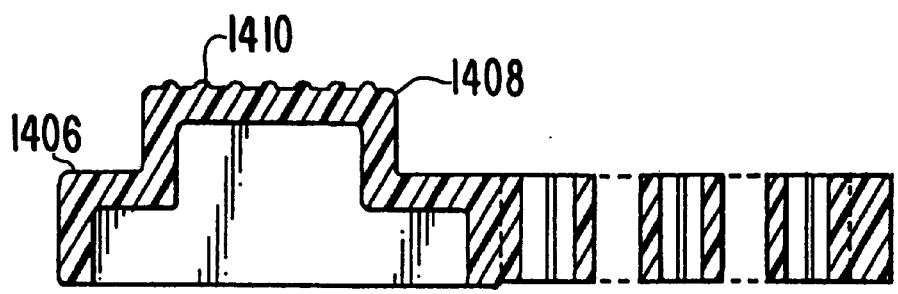
FIG. 14D is a cross-sectional view of the projecting member in accordance with the present invention

FIGS. 10–12 generally show a device that locks the moving portion 200 in place and requires operator intervention to move the moving portion 200. For convenience in discussing this device, it is referred to as a rotation lock 1000. The rotation lock 1000 helps to prevent inadvertent twisting of the moving portion 200, thereby preventing inadvertent release of the sliding catches 702 (see FIG. 7) and finally preventing inadvertent folding of the stroller 100. The use of the rotation lock 1000 is preferred, but it is also optional.

The preferred rotation lock 1000 includes a projecting member 1002 housed in a bulge 1004. The bulge is preferably formed on one of the outer members 304 of the moving member 200. In a first position, the projecting member 1002 cooperates with a receiving member 1006. The receiving member is preferably formed integral with one of the end caps 350 or 252. For purposes of simplifying this disclosure, the receiving member is shown in the left end cap 350. It should be understood that when the projecting member 1002 is in the first position and enters the receiving member 1006, the preferred projecting member 1002 generally prevents the moving member 200 from releasing the slidable catch 702 (see FIG. 7) and thus preventing the stroller from collapsing.

In the preferred embodiment, the projecting member 1002 is mounted on the moving member 200 and slides axially to enter the receiving member 1006 mounted on end cap 350. Since end cap 350 cannot rotate, when the projecting member 1002 is in a first position, the projecting member 1002 prevents the moving member 200 from rotating. This first position is shown in FIG. 11.

The preferred projecting member 1002 is shown in detail in FIGS. 14A–14D. The projecting member 1002 has an engaging end 1402 and a resilient end 1404.

The engaging end 1402 has a nose portion 1406 that enters the receiving member 1006 (see FIG. 10). The engaging end 1402 also has a raised finger land 1408. The finger land 1408 can have grooves, bumps, contours or any other irregularity to improve gripping by an operators finger. The preferred finger land 1408 has a series of bumps 1410 that improve grip.

The resilient end 1404 of the projecting member 1002 includes an integral spring 1412. The preferred spring 1412 is made integral with the engaging end 1402. The preferred spring 1412 is also made of the same material as the engaging end 1402. This allows both the engaging end and the resilient end 1404, which contains spring 1412 to be constructed as one homogenous and monolithic member. This reduces the number of parts and thus, reduces the cost of manufacturing the projecting member.

Spring 1412 is preferably constructed of a zig-zag configuration. The preferred spring 1412 has linear portions that are angled and connected by angled joints. The resilient end 1404 and spring 1412 provide a resilient or spring bias to the engaging end 1402. The other end of spring 1402 includes a flat foot 1414. As shown in FIGS. 10 and 11, foot 1414 presses against a blind end 1102 of bulge 1004.

This assembly provides a spring bias for the engaging end 1402 of the projecting member 1002. As shown in FIG. 10, the spring bias tends to move the engaging end 1402 of projecting member 1002 away from the blind end 1102. In other words, the spring bias of the projecting member 1002 tends to bias the engaging end 1402 outward and toward the receiving member 1006.

When the user wishes to disengage rotation lock 1000, the operator simply moves the projecting member 1002 out of engagement with the receiving member 1006. The operator accomplishes this by sliding the engaging end 1402 of projecting member 1002 against the spring bias and toward blind end 1102. When the projecting member 1002 has cleared the receiving member 1006, the moving portion 200 is then free to move.

In the preferred embodiment, the moving portion 200 can then rotate and operate the locking devices 112 (see FIG. 1) as disclosed above. When the moving portion 200 is rotated the rotation lock 1000 assumes a second position shown in FIG. 12. FIG. 12 is an exaggerated schematic drawing that shows the moving portion about 180° from the locked position shown in FIG. 10. This is done for clarity. The invention prefers a maximum unlocked position, dictated by the circumferential extent of grooves 310, 312, 322, and 324 (shown in FIGS. 3A and 3B), to be less than 180° from the locked position.

An additional feature of the present invention relates to the design of the end cap 350 and lip 1020 (see FIG. 10). When the moving portion assumes a second position in which projecting member 1002 is not in alignment with receiving member 1006, the preferred embodiment includes a lip 1020 shown in FIGS. 10 and 12. This lip 1020 prevents the projecting member 1002 from sliding back out. Lip 1002 keeps the projecting member 1002 in its compressed state, as shown in FIG. 12.

Projecting member 1002 essentially hangs on lip 1020. When the moving portion 200 is rotated back and projecting member 1002 aligns with receiving member 1006, the projecting member will then snap back into the receiving member 1006 because previously, the projecting member 1002 was hung up on lip 1020.

This feature of including a lip 1020 allows the projecting member 1002 to automatically snap back into the receiving member 1006. In other words, when the moving portion 200 is returning from the second position to the first locked position, the operator does not have to slide engaging end 1402 against the spring bias and hunt for the receiving member 1006. Because of lip 1020, the projecting member will automatically snap back into the receiving member 1006 and the device will again assume the locked first position.

Any of the features of the invention disclosed can be used separately, or the features of the present invention can be combined and used together.

It will be apparent to those skilled in the art that various modifications and variations can be made in the child walker of the present invention without departing from the spirit or scope of the invention. Thus, it is intended that the present invention cover the modifications and variations of this invention provided they come within the scope of the appended claims and their equivalents.

I claim:

1. A stroller having a frame that is foldable between an extended configuration and a collapsed configuration, and a pair of locking device mounted on the frame to lock the frame in the extended configuration, the frame having a handle connected to portions of the frame connected to the locking devices, the stroller further comprising:

a release mechanism mounted on a portion of the handle, the release mechanism comprising:

a moving member rotatably mounted to the handle portion, the moving member being rotatable between a locked position and an unlocked position;

a motion transfer mechanism comprising a first opposing pair of helical grooves and a second opposing pair of helical grooves formed on the moving member, and a first slot and a second slot extending through the portion of the handle, the first and second slot being parallel and collinear;

a pair of pulling members movably disposed relative to the handle portion and operably connected to the locking devices, the pulling members comprising a first pin guided in the first slot, the first pin having opposing ends extending outwardly from the handle portion, the opposing ends of the first pin being guided in the first opposing pair of helical grooves and a second pin guided in the second slot, the second pin having opposing ends extending outwardly from the handle portion, the opposing ends of the second pin being guided in the second opposing pair of helical grooves, wherein the first and second opposing pairs of helical grooves are configured to move the first and second pins in opposing directions, while the first and second slots confine the first and second pins linearly; and a rotation lock that prevents the moving member from releasing the locking devices, the rotation lock comprising a receiving member mounted on the handle portion and a reciprocating member mounted on the moving member, the reciprocating member engaging the receiving member to prevent the moving member from rotating, wherein the reciprocating member is movable toward and away from the receiving member and is biased toward the receiving member so that the reciprocating member automatically engages the receiving member when the moving member is rotated to the locked position, and wherein the first and second pairs of helical grooves are configured to engage and maintain the first and second pins held between the first and second opposing pairs of helical grooves without separately biasing the first and second pins.

2. A stroller according to claim 1, wherein the moving member is rotatable about an axis generally parallel to the longitudinal axis of the handle portion.

3. A stroller according to claim 1, further including wires directly connected to the first and second pins, the wires connecting the pins to the locking devices.

4. A stroller according to claim 1, wherein the moving member comprises two half shells connected together.

5. A stroller according to claim 1, wherein the moving member comprises two half shells connected together, the pair of grooves being formed on the inner periphery of each of the two half shells.

6. A stroller according to claim 5, wherein each pair of grooves are angled symmetrically in the opposite directions.

7. A stroller according to claim 4, wherein each of the two half shells includes an aligning mortise and an aligning tenon.

8. A stroller according to claim 1, wherein the receiving member is mounted fixedly to the handle portion and has a recess, and wherein the reciprocating member has a nose portion and a finger land, the nose portion being insertable in the recess to prevent the moving member from rotating.

9. A stroller according to claim 8, wherein the reciprocating member further includes a spring portion integrally formed with the nose portion and the finger land.

10. A stroller according to claim 8, wherein the receiving member has a lip that engages the nose portion to urge the reciprocating member toward the moving member when the moving member is rotated to the unlocked position.

* * * * *